W. A. HOPKINS.
Cultivator.
No. 20,712.          Patented June 29, 1858.
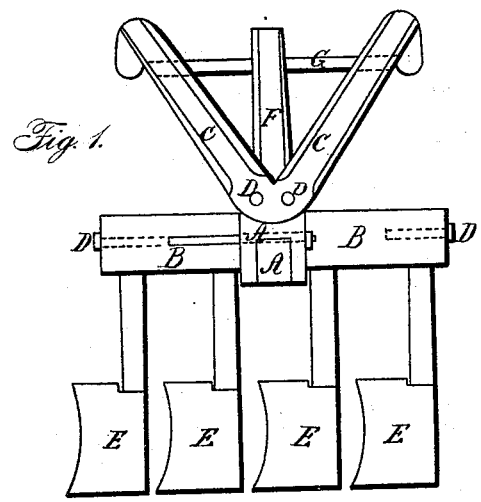
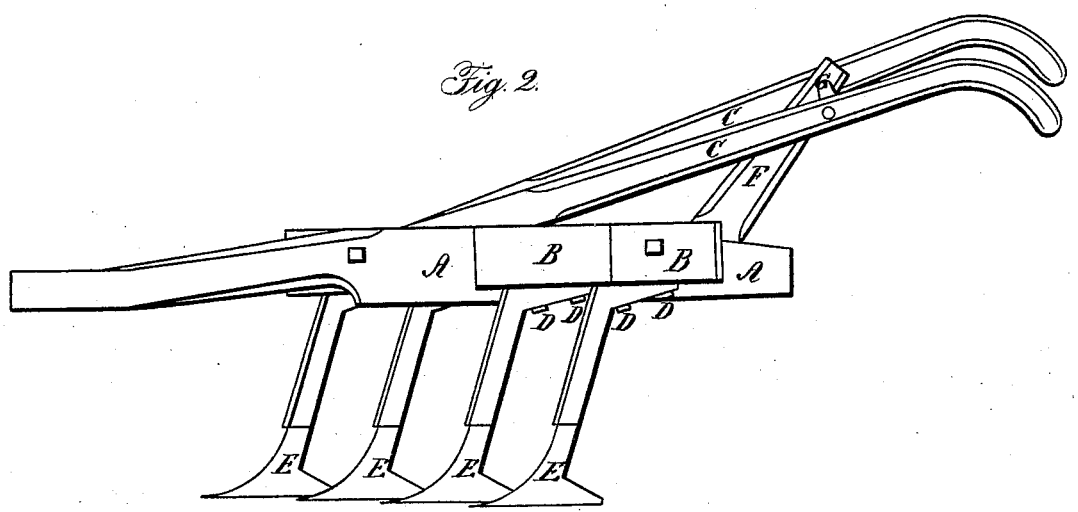
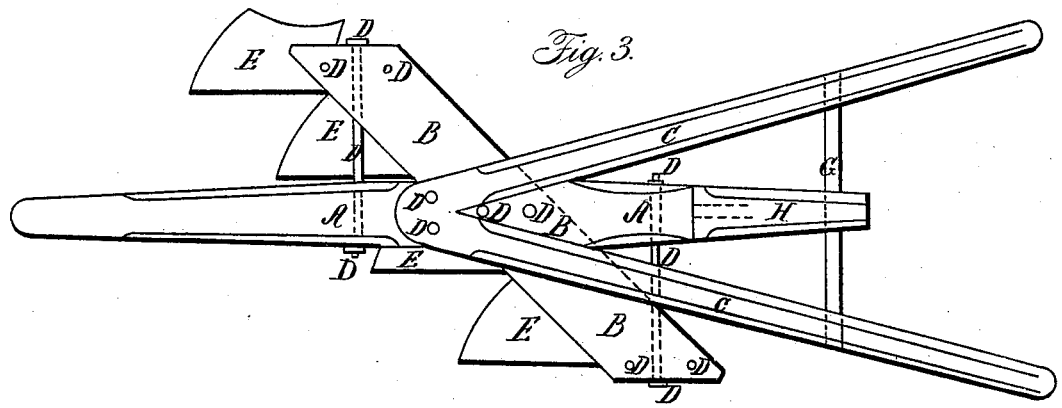

UNITED STATES PATENT OFFICE.

W. A. HOPKINS, OF VICKSBURG, MISSISSIPPI.

IMPROVEMENT IN CULTIVATORS.

Specification forming part of Letters Patent No. 20,712, dated June 29, 1858.

*To all whom it may concern:*

Be it known that I, WILLIAM ASBURY HOPKINS, of the city of Vicksburg, in the county of Warren and State of Mississippi, have invented a new and useful machine, which I call a "Transverse Plow," for the cultivating of corn and cotton, or any other plant that needs plowing, of which the following is a specification.

The nature of my invention consists in its being on a new plan in its construction and also in its operation.

To enable others skilled in the art to make and use my invention, I will proceed to describe its construction and operation; and I do hereby declare that the following is a full and a clear description of the construction and operation of the same, reference being had to the annexed drawings, making a part of this specification, in which—

Figure 1 is a front view; Fig. 2, a side view; Fig. 3, a bird's-eye or downward view.

The letter A is a beam; letter B, transverse beam; letter C, handles; letter D, bolts and nuts; letter E, shares; letter F, standard; letter G, stay.

I construct my transverse plow by having a main beam, upon which I place a transverse beam, being dovetailed or let into each other and fastened together by two screw-bolts through each beam with nuts. The lower or main beam and transverse beam are made secure by a large bolt passing through each beam in front with nuts, and also a large bolt passing through beams in the rear with nuts, a standard mortised in the end of the main or lower beam, around through upper end for the handles, which, with being fastened to the main and transverse beams, makes them secure or firm. I then attach my plow-frames with the shares fastened with screw-bolts and nuts to the transverse beam, so that the heel of the second plowshare comes in a line with the heel of the first plow, the third with the second, and the fourth with the third, making each plow do its own work.

The operation of this transverse plow is that the first plow throws its furrow to the plant, the second throws its furrow to that of the first, and the third to that of the second, and the fourth to that of the third, making a bed of four furrows, this plow doing the work of four single plows in proper order.

This plow can be made of lighter or heavier dimensions, so that a light plow made on this plan can be drawn by one horse and do the work of four hands and four horses. By making this plow heavier two horses will draw it with ease, so that it can be constructed to work according to the horse-power intended to be applied to break up or cultivate land.

What I claim, and desire to secure by Letters Patent, is—

The arrangement of the beam A, transverse beam B, handles C, bolts D, shares E, standards F, and stays G, when the several parts are constructed and united together as described, and not otherwise.

WILLIAM ASBURY HOPKINS.

Witnesses:
   ALEX. H. ARTHUR,
   WM. A. FAIRCHILD.